United States Patent [19]

Jacobs et al.

[11] Patent Number: 5,022,769
[45] Date of Patent: Jun. 11, 1991

[54] STATIC BEARING

[75] Inventors: Johannes A. H. M. Jacobs; Peter L. Holster, both of Eindhoven, Netherlands

[73] Assignee: U.S. Philips Corporation, New York, N.Y.

[21] Appl. No.: 535,238

[22] Filed: Jun. 6, 1990

Related U.S. Application Data

[63] Continuation of Ser. No. 318,082, Mar. 2, 1989, abandoned.

[30] Foreign Application Priority Data

Mar. 17, 1988 [NL] Netherlands ............ 8800656

[51] Int. Cl.⁵ .................................. F16C 32/06
[52] U.S. Cl. ............................ 384/118; 384/399
[58] Field of Search ............ 384/118, 113, 119, 111, 384/399

[56] References Cited

U.S. PATENT DOCUMENTS

| | | | |
|---|---|---|---|
| 3,110,527 | 11/1963 | Fox | 384/399 |
| 3,656,822 | 4/1972 | Schwartzman | 384/113 |
| 4,215,903 | 8/1980 | Andrews | 384/399 |

Primary Examiner—Lenard A. Footland
Attorney, Agent, or Firm—Brian J. Wieghaus

[57] ABSTRACT

A static bearing, more particularly a static gas bearing, with a component to be journalled, which is movable with respect to a fixedly arranged bearing part. The bearing part is provided with one or more openings for the supply of a bearing medium between the bearing surfaces facing each other of the component and of the bearing part. The openings communicate with a supply of a bearing medium. A closure member is resiliently arranged opposite each of the supply openings in such a manner that with increasing pressure of the medium in the bearing gap between the surfaces of the component and the bearing part the closure member is moved away from the relevant supply openings and the flow resistance between the supply and the supply opening decreases.

2 Claims, 2 Drawing Sheets

STATIC BEARING

This is a continuation of application Ser. No. 318,082, filed Mar. 2, 1989, abandoned.

BACKGROUND OF THE INVENTION

The invention relates to a static bearing, more particularly a static gas bearing, with a component to be journalled, which is movable with respect to a fixedly arranged bearing part, which bearing part is provided with one or more openings for the supply of a bearing medium.

Bearings of the kind described above are well known in the technique and are also designated as full film bearings. A feature of these bearings is that in operation the surfaces of the component to be journalled and of the bearing part are constantly separated from each other by a layer of bearing medium in the gap between these surfaces. A problem in this kind of bearings is their comparatively low rigidity, i.e. the ratio between the variation of the dimension of the bearing gap and the variation of the load. With increasing load, the bearing gap dimension is reduced, which is very disadvantageous especially in precision machines.

A construction to improve the rigidity of this kind of bearings is described in DE-A-2544872. In this case, the bearing bush is provided with conically extending bearing parts, whose conicity is adapted to the pressure prevailing in the bearing gap.

A disadvantage of these known bearings with variable conicity is that they are sensitive to pneumatic instability ("pneumatic hammer") and are fairly complicated from a constructional viewpoint. A further disadvantage of these bearings is that they have a high consumption of bearing medium with low load.

It is further known from U.S. Pat. No. 3,442,560 for hydraulic full film bearings to increase the rigidity by causing the pressure in the bearing gap to control the passage of the supply for bearing medium. In these known bearings, the volume of the supply lead for the bearing medium is fairly large, which is not acceptable in particular for gas bearings in connection with the instability (pneumatic hammer).

Increase of rigidity by means of elastic supply openings, the passage diameter of the supply openings varying with pressure variation, is further known from ASME Transactions 9, 311-317, 1966.

SUMMARY OF THE INVENTION

The invention has for its object to provide a static bearing of very high rigidity, which can be constructed both as axial and as well as a radial bearing and whose construction is very simple, while it can be fed both with a gaseous and a liquid bearing medium.

The bearing according to the invention is characterized in that a closure member is resiliently arranged opposite to each of the supply openings in such a manner that with increasing pressure of the medium in the bearing gap between the surfaces of the component and the bearing part the closure member is moved away from the relevant supply opening and the flow resistance between the supply and the supply opening decreases.

Due to the fact that each of the closure members is arranged immediately before the relevant supply opening, the volume of the supply lead between the closure member and the bearing gap is a minimum so that the occurrence of pneumatic hammer is substantially completely avoided. When the pressure in the bearing gap increases, this pressure also acts immediately upon the closure member, which is then moved against the spring pressure away from the supply opening, as a result of which the resistance between the supply and the supply opening decreases so that the pressure of the medium in the bearing gap increases additionally and the reduction of the bearing gap is counteracted. Thus, a high rigidity of the bearing is obtained.

A further embodiment of the bearing according to the invention, which is constructed as a radial bearing having a rotary shaft and a bearing bush supporting this shaft, which bush is provided in a centrally arranged plane with a plurality of supply openings distributed regularly along the circumference, is characterized in that the closure member is constituted by an annular bush which is arranged to surround the bearing bush and is resiliently supported in radial direction.

According to a further embodiment, the annular bush has a central part which is arranged opposite to the supply openings and is limited on both sides by a side part, the bearing bush or the annular bush being provided between each of the side parts and the central part with an annular groove, which communicates with the supply for bearing medium.

Thus, the bearing medium can flow on the one hand via the annular grooves through the gap between the central part of the annular bush and the bearing bush to the supply openings and into the bearing gap. On the other hand, a part of the medium supplied flows through the gaps between the side parts and the bearing bush. When now the load on the shaft varies, in the first instance the shaft will be displaced to one side of the bearing bush. On this side, the bearing gap consequently becomes narrower, whereas the gap becomes wider diametrically opposite thereto. In the narrower part of the bearing gap, the pressure increases, whereas the pressure decreases in the wider part. Via the supply openings, the annular bush senses this pressure difference and the bush will be displaced in the direction of this pressure difference, which results in that the supply openings on the side on which the bearing gap is narrowed are freed to a greater extent and on the other side are closed to a greater extent. This results in that on the narrowed side of the bearing gap bearing medium is supplied more readily, while this supply is effected less readily on the other side so that the shaft is pushed back towards its original central position. The flows of medium in the gap between the side parts and the bearing bush then act as springs.

In order that the desired radial distance between the central part of the annular bush and the bearing bush can be adjusted, the part of the bearing bush provided with supply openings and the central part of the annular bush located opposite thereto are conical, while means are provided by which the annular bush can be displaced axially with respect to the bearing bush.

BRIEF DESCRIPTION OF THE DRAWING

The invention will be described more fully with reference to the drawings.

DESCRIPTION OF THE PREFERRED EMBODIMENTS

Figure 1:
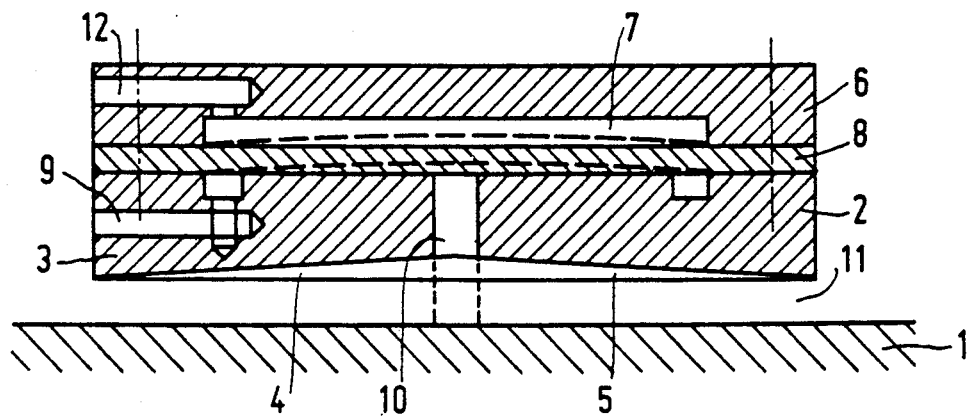
FIG. 1 shows diagrammatically in sectional view an axial bearing.

In FIG. 1, reference numeral 1 denotes a fixedly arranged bearing part. Above this fixedly arranged bearing part 1 is provided a bearing foot 2, which is composed of a part 3 having obliquely extending bearing surfaces 4 and 5. The bearing foot 2 further consists of a part 6, in which a chamber 7 is recessed.

A diaphragm 8 is stretched between the parts 3 and 6. Via a supply duct 9, pressurized bearing medium can be supplied, which can flow between the diaphragm 8 and the bearing part 3 to a supply opening 10, which merges between the bearing surfaces 4 and 5 into the bearing gap 11 between the bearing foot 2 and the fixedly arranged bearing part 1. Due to the pressure in the bearing medium, the diaphragm 8 is pushed slightly away upwards so that in dependence upon the prevailing pressure a given supply gap is formed between the diaphragm 8 and the part 3. When now the load on the bearing foot 2 increases, in the first instance the bearing foot 2 will be pressed towards the bearing part 1. This results in that the gap 11 will become smaller. Consequently, the pressure of the bearing medium in the gap 11 increases. This increased pressure also prevails in the supply opening 10 and consequently acts upon the diaphragm 8, as a result of which the latter is pushed away further upwards, which results in that the gap between the diaphragm 8 and the part 3 becomes larger and a larger quantity of medium will flow from the supply duct 9 to the supply opening 10 and the bearing gap 11. This results in that the bearing foot 2 is pushed upwards, i.e. back towards its starting position. Therefore, the change in position of the bearing foot 2 due to the increased load is eliminated again, which means that this bearing foot is therefore insensitive to load variations, or in other words: this bearing foot has a high, if desired rigidity.

As the case may be, the part 6 of the bearing foot 2 may be provided with a supply duct 12, through which a pressurized control medium may be introduced into the chamber 7. Thus, the spring characteristic of the diaphragm 8 can be influenced. Thus, the sensitivity of the bearing foot 2 can be adapted to given conditions.

Figure 2:
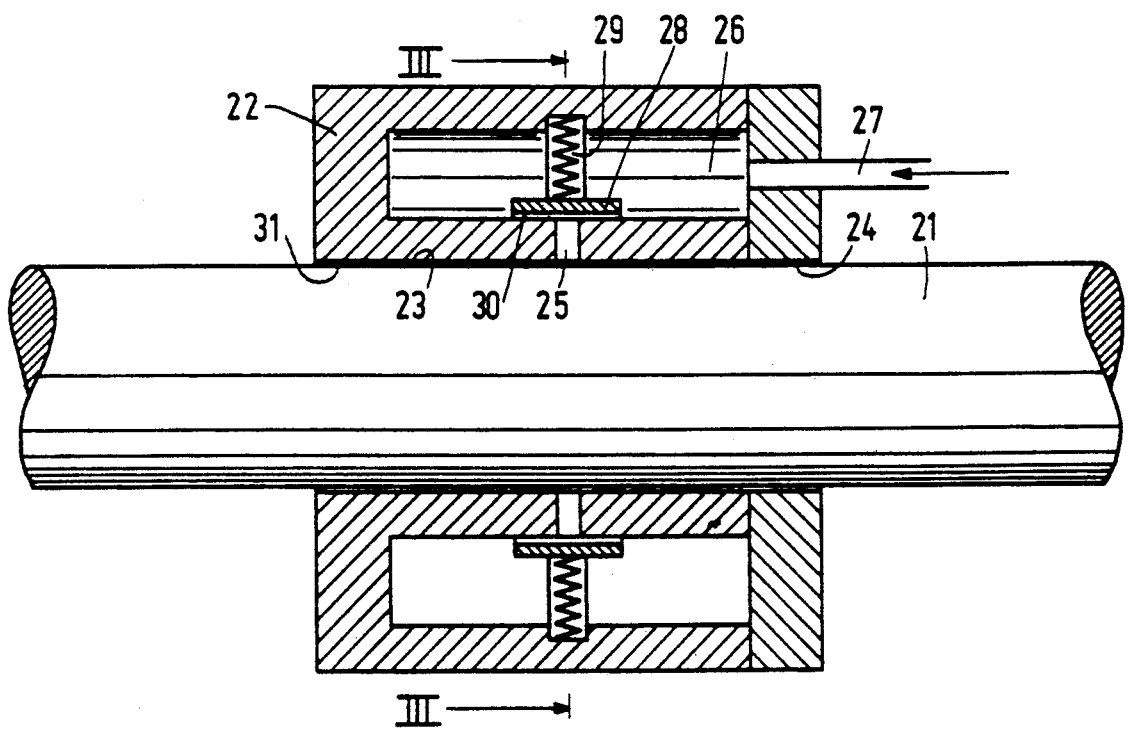
FIGS. 2 and 3 show diagrammatically in sectional view an embodiment of a radial bearing.
Figure 3:
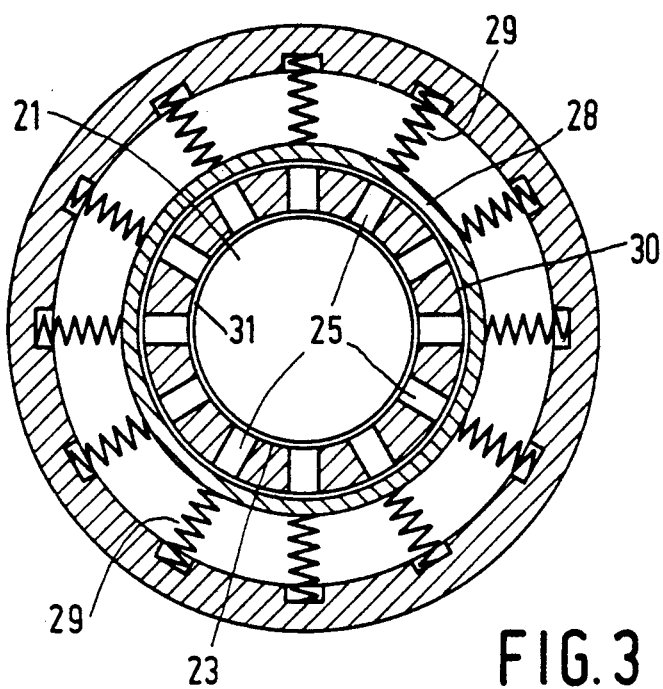

FIGS. 2 and 3 show diagrammatically in two orthogonal sectional views a radial bearing. This radial bearing comprises a shaft 21, which is journalled in a fixedly arranged bearing bush 22. The bearing bush 22 is provided with two bearing surfaces 23 and 24, between which merge a number of supply openings 25 for bearing medium distributed over the circumference. The supply openings 25 merge with their other sides into a chamber 26 in the bearing bush 22, this chamber being provided with a supply 27 for pressurized bearing medium. A loose ring 28 is arranged in the chamber 26 opposite to the supply openings 25 and this ring is radially supported by springs 29 distributed over its circumference.

The operation of this bearing is as follows. Via the supply 27, pressurized bearing medium is supplied. This bearing medium flows via the chamber 26 through the gap 30 between the ring 28 and the bearing foot to the supply openings 25 and thence through the bearing gap 31 between the bearing foot and the shaft to the environment. When no load acts upon the shaft 21, this shaft lies centrally in the bearing bush 22. This means that the gap 31 has over the whole circumference the same dimension and that the same pressure prevails over the whole circumference in this gap. Via the openings 25, this pressure also acts upon the ring 28 so that the same pressure prevails in the gap 30 also over its whole circumference and this gap has the same dimension also over its whole circumference.

When now a load is exerted on the shaft 21 in a given direction, in the first instance the shaft 21 will be pressed in this direction to the bearing bush. The consequence is that the dimension of the gap 31 will decrease towards the load, while at an area radially opposite thereto the gap dimension increases.

At the area at which the gap 31 has become narrower, the pressure in the bearing medium will increase, whereas radially opposite thereto at the area at which the gap has become wider, the pressure in the bearing medium decreases. Through the supply openings, these pressures act upon the ring 28, which results in that at the area at which the pressure has increased the ring 28 is pushed away from the relevant supply openings, while at the area at which the pressure has decreased the ring 28 will close more completely the supply openings 25. The ring 28 is consequently displaced against the action of the springs 29 in a direction opposite to that in which the load acts. This results in that at the area at which the gap 31 has become narrower the gap 30 becomes larger so that a larger quantity of bearing medium is supplied via the supply openings 25 to the bearing gap 31. Radially opposite thereto, exactly the inverse situation is obtained, that is to say that a smaller quantity of bearing medium flows to that part of the bearing gap 31 which has become wider. This results in that the bearing medium in the gap 31 exerts on the shaft 21 a force which is opposite to the load, which leads to the disturbance of the position of the shaft, so that the shaft 21 is pushed back towards its central position.

In this manner, again a journalling of the shaft 21 is therefore obtained which upon change of the load on the shaft 21 does not or substantially does not lead to a change of the position of the shaft 21 in the bearing bush; therefore, the rigidity of such a bearing is very high.

Figure 4:
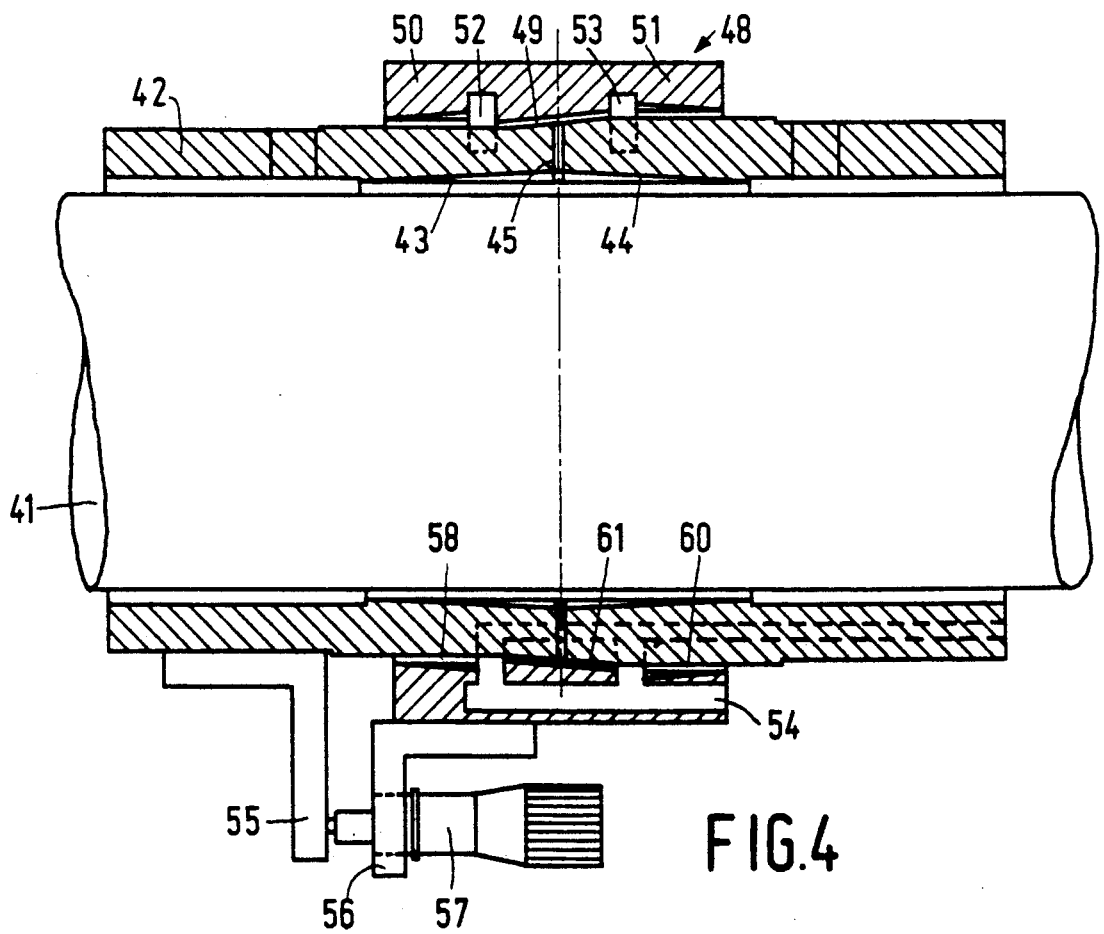
FIG. 4 shows in sectional view diagrammatically a further embodiment of a radial bearing.

FIG. 4 shows diagrammatically in sectional view a further embodiment of a radial bearing. This bearing comprises a shaft 41, which is journalled in a fixedly arranged bearing bush 42. The bearing bush 42 is provided with two bearing surfaces 43 and 44, between which merge supply openings 45 for bearing medium distributed over the circumference. An annular bush 48 is arranged to surround the bearing bush 42 and is composed of a central part 49 and two side parts 50 and 51. The central part 49 is located opposite to the supply openings 45 and is of conical shape. The part of the bearing bush 42 cooperating with the central part 49 is also of conical shape. The side parts 50 and 51 are each separated by a groove 52 and 53, respectively, from the central part 49. The grooves 52 and 53 each communicate with a supply 54 for bearing medium. In the drawing, dotted lines indicate how the grooves and the supply for bearing medium may also be provided in the bearing bush.

In order that the annular bush 48 can be axially displaced with respect to the bearing bush 42, the bearing bush is provided with an L-shaped constructional part 55, while the bush 48 is also provided with such a constructional part 56. The part 56 is provided with an adjustment screw 57, by means of which the distance between the parts 55 and 56 can be varied. The operation of this bearing is equal to that of the bearing shown in FIGS. 2 and 3. The function of the spring 29 in this bearing is taken over by the side parts 50 and 51 of the annular bush 48, which each constitute a static bearing. If in fact the position of the bush 48 with respect to the bearing bush 42 is changed, the pressure of the bearing medium in the gaps 58 and 60 will oppose like a spring to such a change and will exert a force on the bush 48 which attempts to bring the bush 48 again into a position in which the dimension of the gaps 58 and 60 throughout their circumference is the same again.

The conical shape of the central part 49 and the part of the bearing bush cooperating therewith provides the possibility to adjusting the width of the gap 61 by axial displacement of the bush 48 with respect to the bearing bush 42 by means of the adjustment screw 57. Thus, the degree of rigidity of this bearing can be adapted to the conditions in which this bearing has to be used.

What is claimed is:

1. A radial static bearing comprising an annular bearing bush for rotatably supporting a journal, said bearing bush having a bearing surface spaced from said journal defining a bearing space, an annular chamber adjacent said bearing surface into which a bearing medium is supplied under pressure during bearing operation, a plurality of supply openings extending from said annular chamber through said bearing surface for supplying bearing medium from said annular chamber to said bearing space and for communicating pressure of said bearing medium in said bearing space to said annular chamber, and valve means associated with each opening for controlling the passage of fluid through said each opening in response to changes in pressure of the bearing medium in the bearing space adjacent said each opening, characterized in that:

said valve means comprises a continuous annular flexible ring in said chamber and biasing means for biasing said flexible ring towards said openings, said annular ring being spaced from said supply openings with a predetermined gap in the unloaded condition of said biasing means.

2. A radial static bearing as claimed in claim 1, wherein said biasing means comprises a plurality of coil springs each bearing against a portion of said annular ring opposite a respective supply opening and radially aligned with said supply opening.

* * * * *